US012811965B2

(12) United States Patent
Freitas et al.

(10) Patent No.: US 12,811,965 B2
(45) Date of Patent: Nov. 24, 2026

(54) CYBERSECURITY INCIDENT CORRELATION

(71) Applicant: MICROSOFT TECHNOLOGY LICENSING, LLC, Redmond, WA (US)

(72) Inventors: Scott Alexander Freitas, Phoenix, AZ (US); Amirhossein Gharib, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 18/755,557

(22) Filed: Jun. 26, 2024

(65) Prior Publication Data

US 2026/0006048 A1 Jan. 1, 2026

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS 11,734,423 B1 * 8/2023 Soliman ................ G06F 21/554 726/23
2024/0089285 A1 * 3/2024 Jakobsson ............ H04L 51/212
2025/0358297 A1 * 11/2025 Soliman .............. H04L 63/1416

OTHER PUBLICATIONS

"Minimum spanning tree", Wikipedia, 2024, 13 pages.
Freitas, et al., "Graph Weaver: Billion-Scale Cybersecurity Incident Correlation", ACM, Jun. 3, 2024, 2 pages.

* cited by examiner

*Primary Examiner* — Jeffrey C Pwu
*Assistant Examiner* — Thong P Truong
(74) *Attorney, Agent, or Firm* — David Foster; Newport IP, LLC

(57) ABSTRACT

Disclosed is a system designed to efficiently process, correlate, and analyze alerts generated by large numbers of computing devices. Alerts are analyzed to identify when an incident is taking place. In some configurations, alerts are correlated based on shared attributes, such as an IP address, username, or session identifier. Correlations may be filtered based on domain knowledge and threat intelligence. The remaining correlations are used to construct a graph that represents an incident. Alerts are represented in the graph as vertices while correlations are represented as edges. The graph is pruned of redundant correlations, resulting in a streamlined representation of the incident. Reducing the number of correlations reduces the time required to identify an incident, improves accuracy, and allows for human experts to refine the process further by analyzing and adjusting key parameters.

20 Claims, 7 Drawing Sheets

CYBERSECURITY INCIDENT CORRELATION

BACKGROUND

Cyberattacks are becoming increasingly complex, posing significant challenges for detection and mitigation. Successful attacks allow threat actors to steal data, disrupt operations, tarnish reputations, perform espionage, etc. These attacks often span multiple devices and originate from various points of origin.

Security software may raise an alert when suspicious activity is detected on a computing device. However, it is difficult to distinguish benign activity from true incidents based on individual alerts. At the same time, an increase in the number of threat actors and a proliferation of security solutions aimed at thwarting them has significantly increased the volume of alerts. Discerning genuine incidents from a large volume of benign alerts is a formidable challenge. The increasing number of alerts also requires an increasing amount of computing power, storage, and other resources. It is also challenging to process the vast number of alerts quickly enough to identify an incident before a significant amount of damage has been inflicted.

It is with respect to these and other considerations that the disclosure made herein is presented.

SUMMARY

Disclosed is a system designed to efficiently process, correlate, and analyze alerts generated by large numbers of computing devices. Alerts are analyzed to identify when an incident is taking place. In some configurations, alerts are correlated based on shared attributes, such as an IP address, username, or session identifier. Correlations may be filtered based on domain knowledge and threat intelligence. The remaining correlations are used to construct a graph that represents an incident. Alerts are represented in the graph as vertices while correlations are represented as edges. The graph is pruned of redundant correlations, resulting in a streamlined representation of the incident. Reducing the number of correlations reduces the time required to identify an incident, improves accuracy, and allows for human experts to refine the process further by analyzing and adjusting key parameters.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
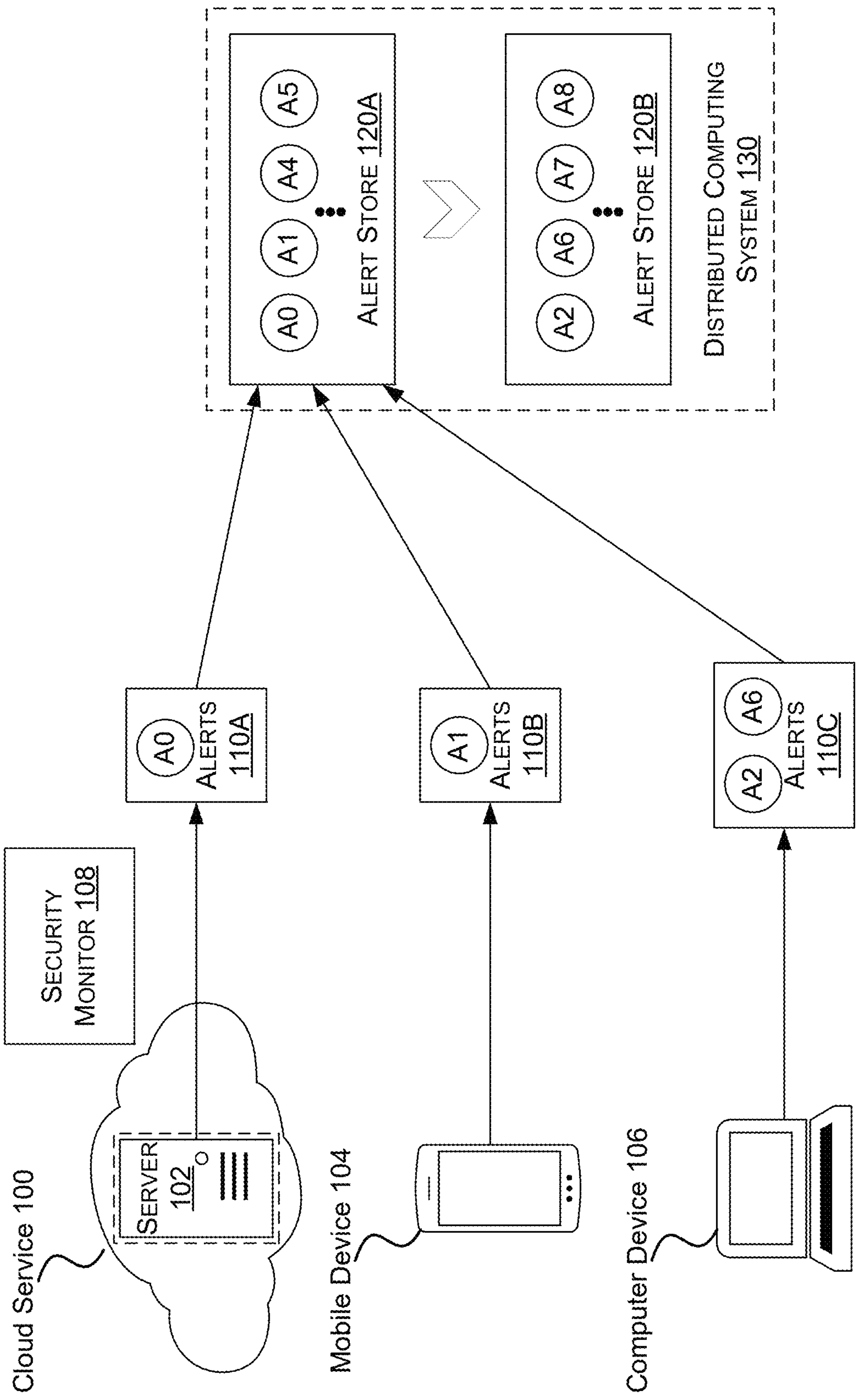
FIG. 1 illustrates receiving alerts from a number of computing devices.

In the realm of cybersecurity, accurately and efficiently correlating billions of alerts into incidents is a substantial challenge. Traditional correlation techniques often struggle with maintenance and scaling. Existing techniques also struggle to adapt to emerging threats and to integrate novel sources of telemetry.

Other challenges faced when identifying incidents from large numbers of alerts include mitigating false correlations, minimizing missed correlations, scalability, and effectively integrating threat intelligence and domain knowledge.

Mitigating false correlations: false correlations pose a significant risk, potentially leading to unwarranted countermeasures being taken on devices that do not pose a risk. This has the potential to disrupt vital company operations. Additionally, over-correlation can result in "black hole" incidents, where all alerts within an enterprise begin to correlate indiscriminately.

Minimizing missed correlations: avoiding false negatives is equally important. A missed correlation could allow a cyberattack to proceed undetected, potentially leading to the loss of valuable data and intellectual property.

Scalability: correlating billions of alerts across a multitude of security products presents a monumental scaling challenge, requiring a robust infrastructure and an efficient methodology. Furthermore, these correlations need to happen in near real-time to keep security operators up to date.

Integrating threat intelligence and domain knowledge: correlation across diverse entity types such as IP addresses and files often requires specialized threat intelligence (TI) and domain knowledge to mitigate false positive and false negative correlations.

Disclosed is an industry-scale framework that shifts the traditional incident correlation process to a data-optimized, geo-distributed graph-based approach. The disclosed embodiments enable correlation of billions of alerts across hundreds of thousands of enterprises. In some configurations, a geo-distributed database and analytics engine efficiently processes alerts generated by computing devices around the world. Security domain knowledge and threat intelligence are used to correlate alerts, increasing incident detection accuracy. In some configurations, a minimum spanning tree algorithm optimizes correlation storage. A human-in-the-loop feedback system enables key correlation processes and parameters to be continuously refined.

One implementation of the disclosed embodiments is designed to identify billions of correlations with a 99% accuracy rate. This accuracy has been confirmed by extensive investigations by security researchers. This implementation has not only maintained high correlation accuracy but is also projected to reduce traditional correlation storage requirements by 7.4×.

In some configurations, alerts raised by computing devices are correlated based on shared attributes-aspects of the alerts that are the same or that are within a defined range. For example, two alerts that reference the same IP address may be correlated because they share the same IP address attribute. Alerts that reference the same file, the same session ID, the same email address, the same URL, or the like, may similarly be correlated. Alerts may be correlated by more than one shared attribute, such as a pair of alerts that refer to the same email address and the same file.

Security alerts that are correlated, directly or indirectly, form an incident graph. A incident graph includes the telemetry relevant to an incident. Intuitively, correlation can be likened to the process of "weaving" together alerts into cohesive incident narratives, grounded in shared indicators of compromise such as malicious files or IP addresses. Associating alerts in this way allows alerts from endpoint devices, identity services, email servers, collaboration tools, cloud services, and data repositories to be integrated into cohesive incident graphs that serve as a representation of threat activity.

The disclosed embodiments also enable incident detection to be refined quickly and intuitively. Filtered incident patterns may be mined to identify potential incident gaps. These potential gaps may be presented to security researchers through a human-in-the-loop feedback system. Researchers may use this information to refine time windows, thresholds, and conditions applied when correlating alerts.

As referred to herein, an alert is an indication of a potential security threat. Alerts may be generated by security software, such as MICROSOFT DEFENDER. For example, an alert may be raised in response to a user logging in from an abnormal location. A user who usually logs in from the United States, but unexpectedly logs in from France, may trigger an alert. Activities can also be the basis for alerts, such as downloading or encrypting a large number of files. Typically a security breach may trigger one hundred alerts or more. Correlating these alerts into an incident allows company security analysts to gain a more complete picture as to what took place, how to remediate the damage, and how to prevent similar attacks in the future. As referred to herein, an incident refers to a security incident such as a ransomware attack, data theft, or other cyberattack.

Alerts may be correlated based on having a shared attribute. For example, two hours after the suspicious login, user A is observed downloading or forwarding abnormal numbers of emails, triggering another alert. These two alerts are correlated because they come from the same user. Showing these alerts together to the customer is helpful in allowing them to draw conclusions and see patterns.

Significant performance improvements have been witnessed with the disclosed embodiments. Correlations are identified faster and with fewer errors. Previous techniques could take as many as ten hours for alerts to be correlated—the disclosed embodiments take closer to 40 minutes. This increase in speed and efficiency allows alerts to be correlated in more dimensions. Some embodiments consider 17 different possible attributes of an alert, almost doubling existing techniques.

Some configurations leverage threat intelligence to improve alert correlation. Often, a single shared attribute, such as IP address, is the only correlation between two alerts. This attribute is very low fidelity—that is, two alerts with the same IP address often constitute a false correlation. To combat this, some configurations vary correlation time windows and other thresholds based on whether threat intelligence indicates that attributes such as IP addresses are malicious, suspicious, or benign. Using threat intelligence to affect correlation is distinct from existing techniques that use threat intelligence for detection.

Continuing the example of a shared IP address, two alerts with the same IP address can create a false correlation because IP addresses can change. For example, an IP address is assigned when using a VPN to access a website. Later, after logging out, someone in the same building may receive the same IP address when using the VPN. IP addresses may also be low fidelity because a number of people, such as employees in a building, may all have the same public IP address.

Threat intelligence may be used to adjust how correlations are identified. For example, threat intelligence may indicate that a malicious IP address is related to threat actors from a particular country. Five alerts are received from five different users having the same malicious IP Address. Correlation identification logic may generate correlations among these alerts due to the threat intelligence. However, correlations may not have been generated if nothing was known about the IP address.

Fidelity of an attribute refers to how likely it is that two alerts with the same attribute are actually from the same user. Some alerts, such as SessionID, are unique identifiers that have high fidelity for a significant amount of time if not indefinitely. Alerts with the same SessionID are always for the same user from the same machine. As such, two alerts with the same SesssionID attribute will be correlated even if the alerts occurred days apart.

Other security domain knowledge may be injected to adjust time windows and other thresholds. Refining these parameters is an iterative process-domain knowledge may be learned in part from correlations that are filtered and correlations that are not filtered when constructing an incident graph. For example, security researchers look deep into a purported correlation, only to determine that the alerts are not related. They may discover why the correlation was identified and update the system to prevent correlations from being found in similar circumstances. Deciding when to tighten or loosen the criteria for correlation identification may entail human judgment that is informed by incident detection and other statistics provided by the system. For example, if the ratio of valid correlations to invalid correlations is 1:1 million, then domain knowledge would be adjusted to filter out this correlation as the burden of 1 million false positives is too great to justify 1 actual positive.

Incidents may be created from large numbers of correlated alerts. For example, when a phishing campaign is launched it usually touches more than one user. It could be directed at 1000 users. This generates a large number of alerts-alerts for clicking on a malicious link, forwarding a link, downloading something suspicious, etc. The generated incident graph will include all of these correlated alerts, illuminating the flow of the attack and the areas they reached during the attack cycle.

FIG. 1 illustrates receiving alerts from a number of computing devices. Cloud service 100 hosts server 102. Server 102 is an example of an individual server computing device hosted by cloud service 100, representative of thousands or more server computing devices that are hosted by cloud service 100 at any given time. Security monitor 108 of server 102 generates alerts 110A. Security monitor 108 may be integrated into an operating system running server 102 or third party security software. Mobile device 104 and computing device 106 similarly generate alerts 110B and 110C, respectively.

As referred to herein, alerts 110 refer to indications of potential security threats. For example, an alert may indicate that a login attempt was made from an unexpected location. Alerts 110 may include one or more attributes, such as SessionId, EmailId, EmailAddress, IPAddress, etc. These attributes are usable to find correlations between alerts, as discussed below in conjunction with FIG. 2. As illustrated, alerts 110A includes an alert named A0, alerts 110B includes an alert named A1, and alerts 110C includes an alert named A2 and an alert named A6.

Alerts 110 are stored in one or more alert stores 120. In some configurations, alert stores 120 are distributed data stores of distributed computing system 130, such as a PySpark DataFrame. In these embodiments, alert store 120 is a virtual store that manages and presents data from one or more underlying physical data stores. This allows an individual alert to be stored local to the device that generated it, reducing network usage and improving data security. In other configurations, alert stores 120 are physical data stores.

Alert stores 120 organize data into named columns, similar to a table in a relational database. Distributed computing system 130, such as Apache Spark, may use multiple nodes to parallelize the processing of alerts 110 stored in alert store 120A. This improves the efficiency of handling of large datasets. For example, distributed computing system 130 may perform or initiate filtering, grouping, aggregating, and/or joining operations on alerts 110 stored in alert store 120A.

In some configurations, multiple alert stores 120 are used to store alerts 110 from different timeframes. For example, alert store 120A may be used to store alerts that were generated within the last 72 hours, although other durations are similarly contemplated. In some configurations, the timeframe of alert store 120A is selected to be at least as long as the longest attribute correlation time window, discussed below in conjunction with FIG. 3.

Alert store 120B may be used to store alerts that were generated in the last 35 minutes, or some other duration that is less than the duration of alert store 120A. In some configurations, alert store 120B is generated by copying the most recent 35 minutes of alerts from alert store 120A. Additionally, or alternatively, alert store 120B may receive and store alerts directly from security monitor 108.

Figure 2:
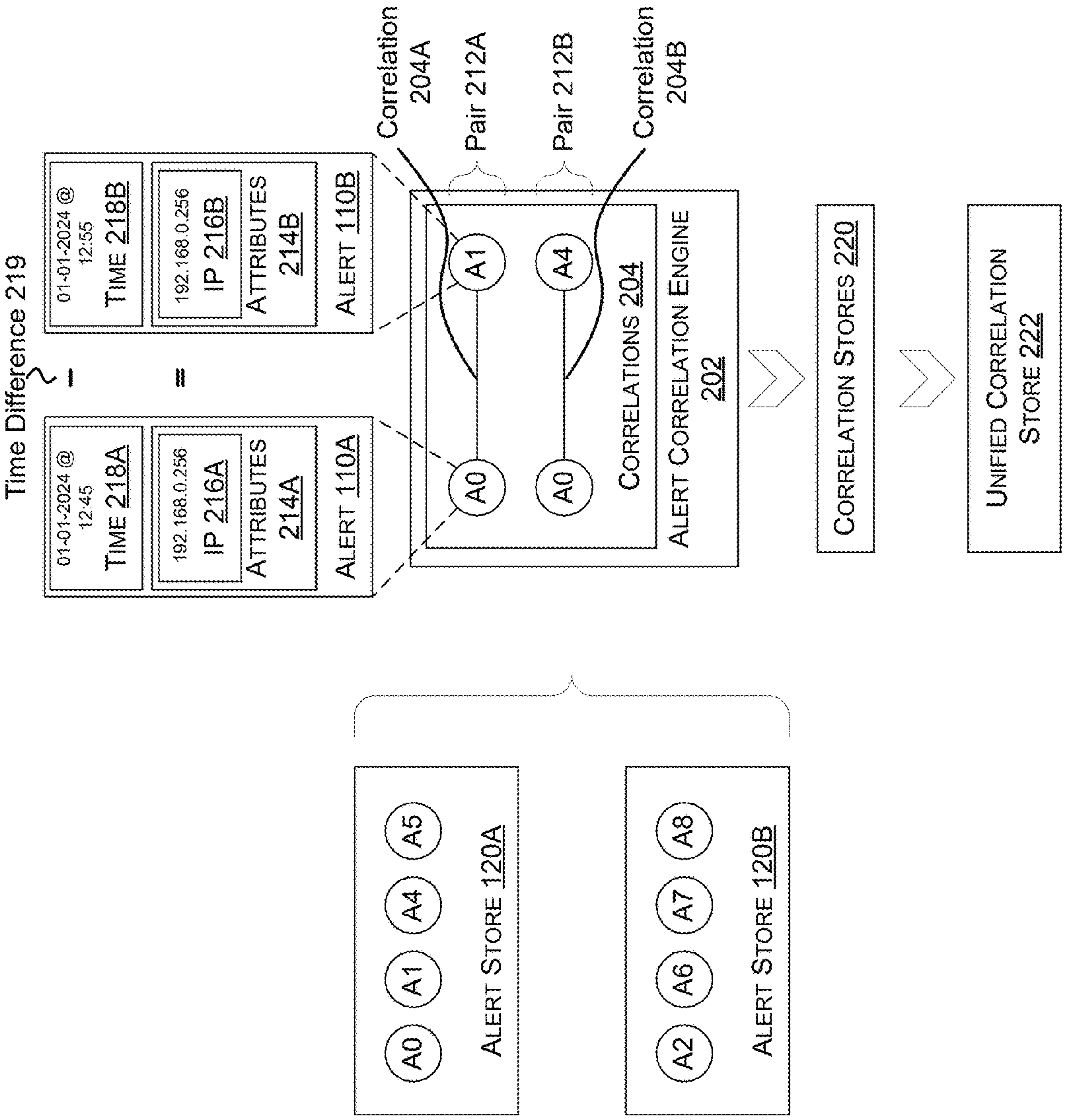
FIG. 2 illustrates identifying correlations between alerts.

FIG. 2 illustrates identifying correlations between alerts. Alert correlation engine 202 receives alerts 110 from alert store 120A for processing. Additionally, or alternatively, alert correlation engine 202 instructs distributed computing nodes of distributed computing system 130 to perform some or all of the processing on computing devices local to the physical storage that backs alert store 120A.

Alert correlation engine 202 identifies correlations 204 between pairs of alerts 212. While pairwise correlations are discussed in conjunction with FIG. 2, other types of correlations are similarly contemplated, including correlations between three or more alerts 110. In some configurations, alert correlation engine 202 identifies correlations 204 by iteratively joining alerts 110 on different attributes. In some configurations, alerts from data store 120A are joined with alerts from data store 120B. This results in correlations that include at least one alert from the more recent timeframe of data store 120B. In this way, recently generated alerts stored in data store 120B are correlated against historical alert data stored in data store 120A. The result of each join may be stored in a different correlation datastore 220, such that each correlation datastore 220 stores correlations for a different attribute. Iteratively joining alerts 110 on all attribute types allows for multiple correlations between the same pair of alerts.

In some configurations, correlation stores 220 are merged into a single unified correlation store 222. In some configurations, each row of unified correlation store 222 indicates all of the attributes found to correlate for a given pair of alerts 212A. For example, each row in unified correlation store 222 may include one column for each of the pair of alerts 212A, a column that identifies an organization associated with the pair of alerts 212A, and a column for each attribute type that could be the basis of a correlation between the pair of alerts 212A. For instance, if alert correlation engine 202 analyzes up to 17 attributes for each pair of alerts, then 17 stores 220 would hold the results. Unified correlation store 222 would then have 17 attribute-specific columns.

In some configurations, two alerts 110 correlate if they share an attribute or are both within a defined range of an attribute. Additional constraints may be applied when determining if a correlation exists for an attribute, such as requiring that both alerts 110 originate from the same organization, or excluding self-correlations.

Attribute collections 214A and 214B represent attributes of alerts 110A and 110B, respectively. IP addresses 216A and 216B are examples of IPAddress attributes. Other attributes, such as EmailSubject, RegistryKey, and SessionId, etc., are similarly contemplated. In this example, IP addresses 216A and 216B are the same, and so alerts 110A and 110B correlate based on the IPAddress attribute. An indication of this correlation may be stored in the correlation store 220 for the IPAddress attribute.

Time 218 indicates the time of the activity or behavior that triggered the alert. In this example, time 218B is ten minutes later than time 218A, yielding a time difference 219 of 10 minutes. Depending on its duration, time difference 219 may or may not be within a time window for one or more of attributes 214. Filtering based on time windows is discussed below in conjunction with FIG. 3.

Figure 3:
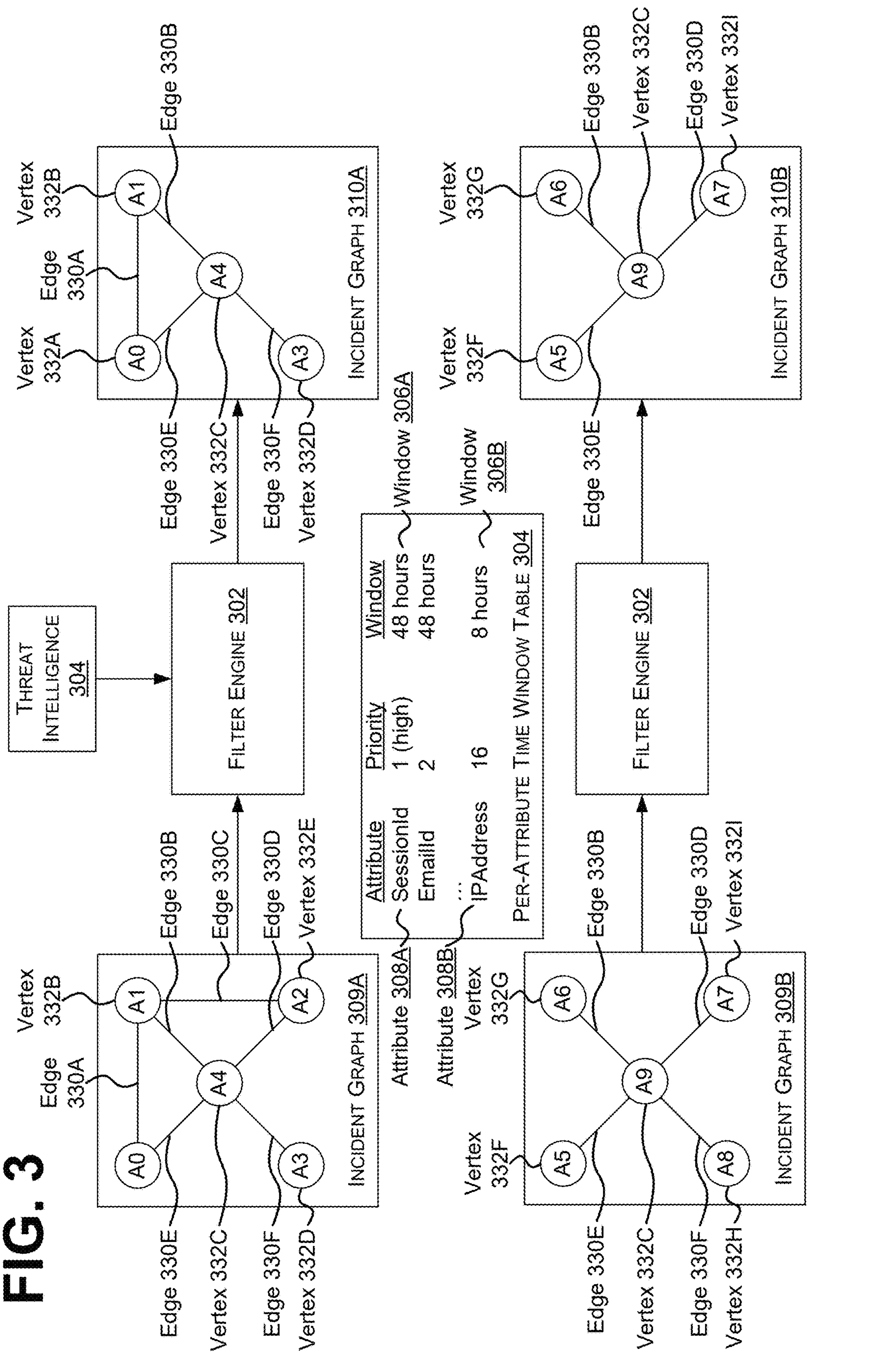
FIG. 3 illustrates filtering correlations based on domain knowledge.

FIG. 3 illustrates filtering correlations based on domain knowledge. In some configurations, filter engine 302 filters out correlations listed in unified correlation store 222. Per-attribute time window table 304 lists some of the available attributes 308, and associated priorities and attribute-specific time windows 306. In some configurations, filter engine 302 filters out correlations based on time differences between pairs of alerts 212. Specifically, correlation 204A between two alerts 110A and 110B is filtered out if time difference 219 exceeds attribute-specific time window 306B. Time windows 306 may be set based on domain knowledge initially and refined using pattern mining, which is described below in conjunction with FIG. 5.

Attributes that are more likely to remain consistent for a threat actor throughout an incident, such as SessionId or a CampaignId of an email campaign, are assigned higher priorities and tend to have longer time windows. Attributes that are less likely to remain consistent throughout an incident, such as IPAddress, have shorter time windows.

One advantage to a longer time window is an increased chance of observing a correlation between alerts. Downsides to longer time windows include the costs of storing and processing additional correlations. For attributes that can change throughout an incident, longer time windows are also more likely to ensnare innocent behavior. For example, IP addresses are frequently re-assigned, such that a correlation between alerts may actually reflect behavior of two different users.

One complete list of attributes 308, priorities, and time windows 306 is listed below:

| Entity | Description | Priority | Time |
|---|---|---|---|
| SessionId | Cloud session id | 1 (high) | 48 h |
| EmailId | Email message id | 2 | 48 h |
| CampaignId | Email campaign id | 3 | 72 h |
| EmailCluster | Email cluster id | 4 | 72 h |
| UserId | User account id | 5 | 24 h |
| URL | Website URL and domain | 6 | 48 h |
| DeviceId | Identifier for device | 7 | 24 h |
| SHA1 | Cryptographic file hash | 8 | 24 h |
| FileName | Name of a file | 9 | 24 h |
| AppId | Identifier for cloud app | 10 | 48 h |
| EmailAddress | Email sender address | 11 | 12 h |
| EmailSubject | Email subject | 12 | 12 h |
| RegistryKey | OS registry key | 14 | 24 h |
| RegistryValue | Data stored in key | 13 | 24 h |
| ResourceId | Cloud resource id | 15 | 24 h |
| IP | IP address | 16 | 8 h |
| IPRange | IP addresses in subnet/24 | 17 (low) | 8 h |

Threat intelligence 304 may be applied to more accurately identify valid correlations for specific attribute types, such as SHA1, FileName, and IPRange. Threat intelligence 304 may indicate, in part, whether a file identified by the FileName attribute, an IP address within the range of an IPRange attribute, or a cryptographic key of an SHA1 attribute, has been recently associated with malicious activity. For example, the IP address 192.168.0.256 may have been identified by a threat investigator to have been used by a malicious actor. When this is the case, it becomes much more likely that the same IP address is being used by a threat actor, and it is much less likely that activity associated with this IP address is benign. Accordingly, time window 306B may be increased, expanding the time window in which alerts from the suspicious IP address may be correlated.

Alert pair 212A may have more than one correlation between them. All but one of these correlations may be removed without affecting the topology of the resulting incident graph. In some configurations, multiple correlations between a pair of alerts are indicated by multiple attribute-correlation columns of unified correlation store 222 indicating a correlation. In some configurations, one correlation is selected at random to be maintained and the remaining correlations are removed. Correlations may be removed by updating the row of unified correlation store 222 such that all but the randomly selected attribute-correlations is removed. In other configurations, different attributes are associated with different priorities, and the correlation with the highest priority is retained while the lower-priority attribute-correlations are removed. An example list of attributes, including their priorities, is included below in conjunction with FIG. 3.

In some configurations, filter engine 302 accepts unified correlation store 222 as input. Filter engine 302 may modify unified correlation store 222 or return a modified copy. FIG. 3 depicts incident graphs 309A and 309B as input to filter engine 302 to illustrate the correlations among alerts of unified correlation store 222 before filtration. Similarly, incident graphs 310A and 310B illustrate the correlations among alerts of unified correlation store 222 after filtration.

Incident graph 309A includes vertices 332A-332E and edges 330A-330F, reflecting correlations listed in unified correlation store 222. After filtration, incident graph 310A includes vertices 332A-332D and edges 330A, 330B, 330E, and 330F. This indicates that edges 330C and 330D were filtered out, and as a result, vertex 332E was no longer connected. Similarly, filter engine 302 removes edge 330F from incident graph 309B, causing vertex 332H to be removed as well.

Figure 4:
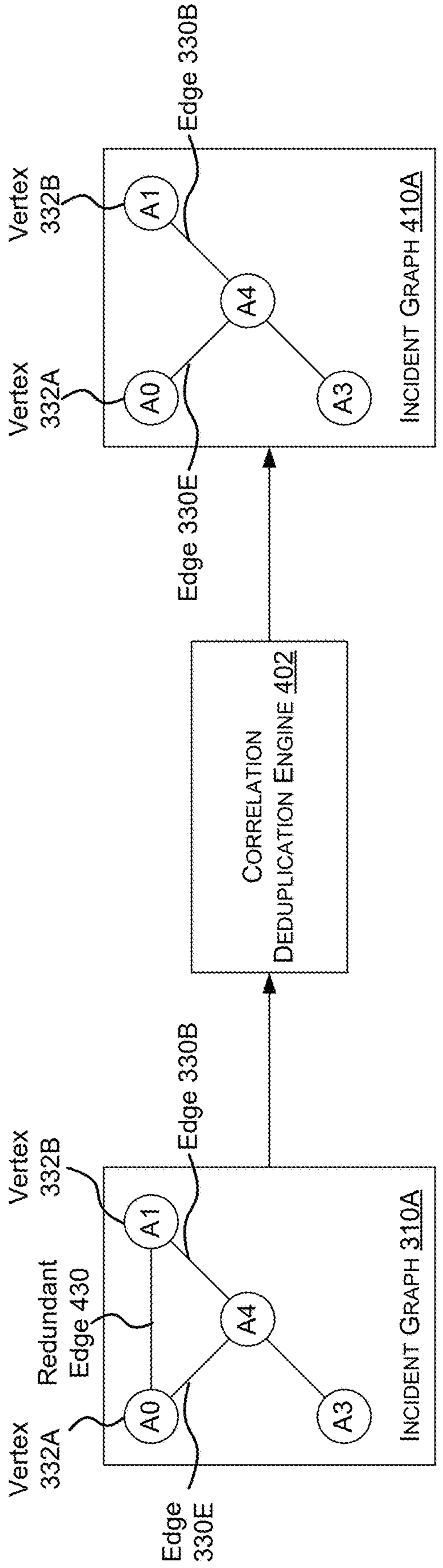
FIG. 4 illustrates pruning an incident graph.

FIG. 4 illustrates pruning an incident graph. Incident graph 310A includes redundant edge 430. A redundant edge refers to an edge connected to a vertex that is connected to the graph along other edges. In this example, without redundant edge 430, vertex 332A would still be connected via edge 330E and vertex 332B would still be connected via edge 330B. Correlation deduplication engine 402 may use a number of techniques to remove redundant edges, such as a minimum spanning tree algorithm.

For example, in an incident involving alerts A0, A1, and A2, with the correlations A1→A2, A2→A3, and A1→A3, redundant correlations like A1→A3 or A2→A3 can be eliminated to streamline the graph. The minimum spanning tree algorithm ensures that a minimum number of edges required connect an incident subgraph. In practice this results in a significant reduction in the number of correlations, saving on storage costs and significantly reducing the compute costs of downstream processes.

Figure 5:
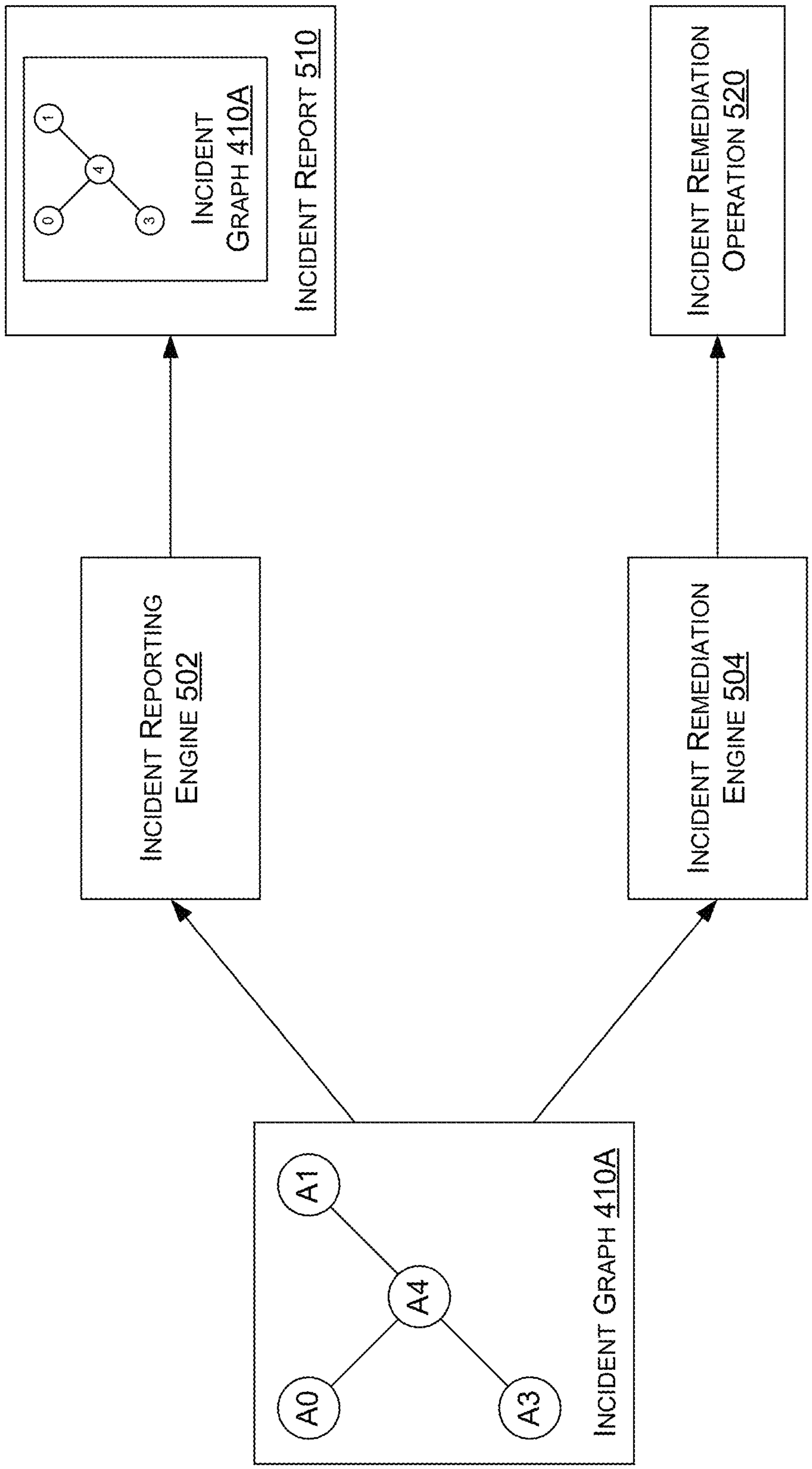
FIG. 5 illustrates performing a security operation with the incident graph.

FIG. 5 illustrates performing a security operation with the incident graph. Incident graph 410A is depicted as part of two security operations-incident reporting engine 502 includes incident graph 410A in incident report 510, while incident remediation engine 504 uses incident graph 410A to identify and configure incident remediation operation 520. Remediation operation 520 may automatically patch a security hole, logout a user, erect or configure a firewall, or otherwise mitigate a cyberattack represented by incident graph 410A.

Incident graphs can be analyzed to identify detailed statistics that provide insights into various aspects of the correlation process. These statistics can include the number of correlations per entity type, correlations segmented by region, correlations categorized by product and detector type, the distribution of incident sizes, the average runtime of correlation processes per region, and the success and failure rates of correlation jobs. Collecting and analyzing these and other statistics serves multiple purposes. First, they offer a comprehensive view of the operational health of our correlation jobs, highlighting potential bottlenecks. Additionally, these metrics enable targeted monitoring, allowing identification of trends, anomalies, and potential areas requiring intervention or optimization.

Incident graphs 410 may be mined for parameter optimization & gap discovery. Parameter optimization refers to optimizing time windows 306 by scrutinizing both valid and rejected correlations. Gap discovery refers to identifying potential correlation gaps stemming from an analysis of invalid correlations. Correlation gaps are identified when a correlation between alerts should have been found, but was not. This human-in-the-loop feedback system ensures that correlation strategies are not only precise, but robust against evolving security challenges.

Time window optimization: the correlation time window 306 for each attribute 308 in per-attribute time window table 304 may be refined by a feedback loop that identifies potential correlation gaps. This process begins by analyzing both valid and rejected correlations from the output of alert correlation engine 202. Key statistical measures are calculated, such as the average, median, and percentiles for the correlation times of valid and invalid correlations, as well as their combined correlations, on a per-attribute basis. These statistics may be forwarded to threat researchers as part of a security operation that initiates a detailed investigation to determine whether increasing time window 306 for specific attributes 308 could reduce false negatives. Similarly, the investigation may determine whether a reduction of time window 306 could decrease false positives.

For example, if a defined number or percentage of correlations were missed because time window was too small for a particular attribute, and if a defined number or percentage of missed correlations happened within a larger time window, and if fewer than a defined number or percentage of additional false positives would have been generated with the larger time window, the time window for the particular attribute may be increased. Continuously refining these time windows 306 based on empirical data and expert insights optimizes the correlation process.

Unoptimized time windows 306 are not the only contributor to correlation gaps. Gaps can also arise from missing threat intelligence, or shifting telemetry as new products and detectors challenge existing assumptions. To address this, rejected correlations are analyzed to identify the most prevalent potential correlation gaps across different detectors and entity types. The findings are then forwarded to a threat research team, allowing them to assess the need for new threat intelligence feeds, revising correlation assumptions, or adjusting various correlation parameters to maintain and enhance the accuracy and relevance of the system.

Figure 6:
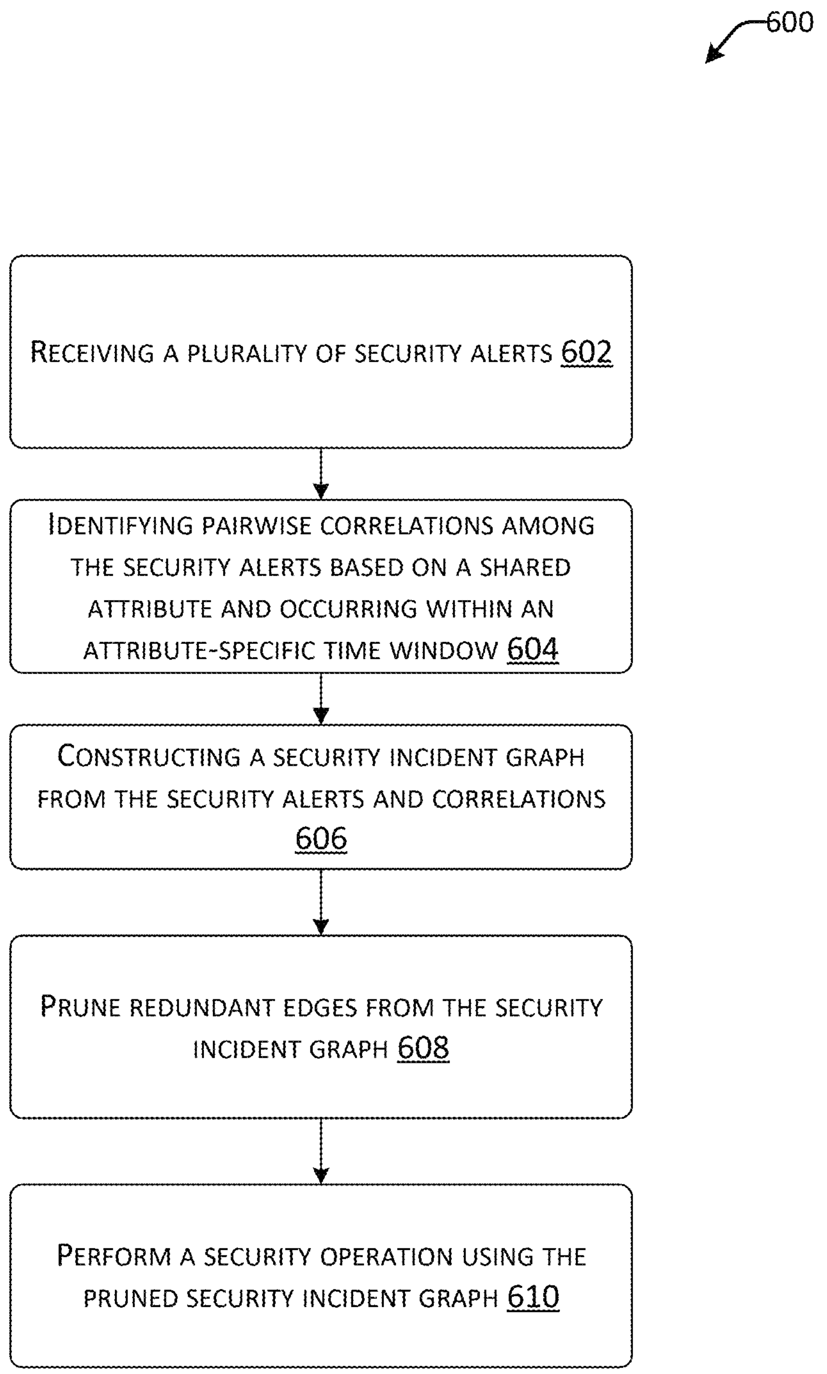
FIG. 6 is a flow diagram of an example method for cybersecurity incident correlation.

FIG. 6 is a flow diagram of an example method for cybersecurity incident correlation. Routine 600 begins at operation 602, a plurality of alerts 110 are received.

Routine 600 continues at operation 604, where pairwise correlations 204 are identified among alerts 110. Individual pairs of alerts 212 correlate by having a shared attribute 216 and occurring within an attribute-specific time window 306.

Routine 600 continues at operation 606, where incident graph 310A is constructed with vertices 332 representing alerts 110 and edges 330 representing correlations 204.

Routine 600 continues at operation 608, where redundant edge 430 is pruned from incident graph 310.

Routine 600 continues at operation 610, where security operation 510 is performed based on the pruned incident graph 410.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 7:
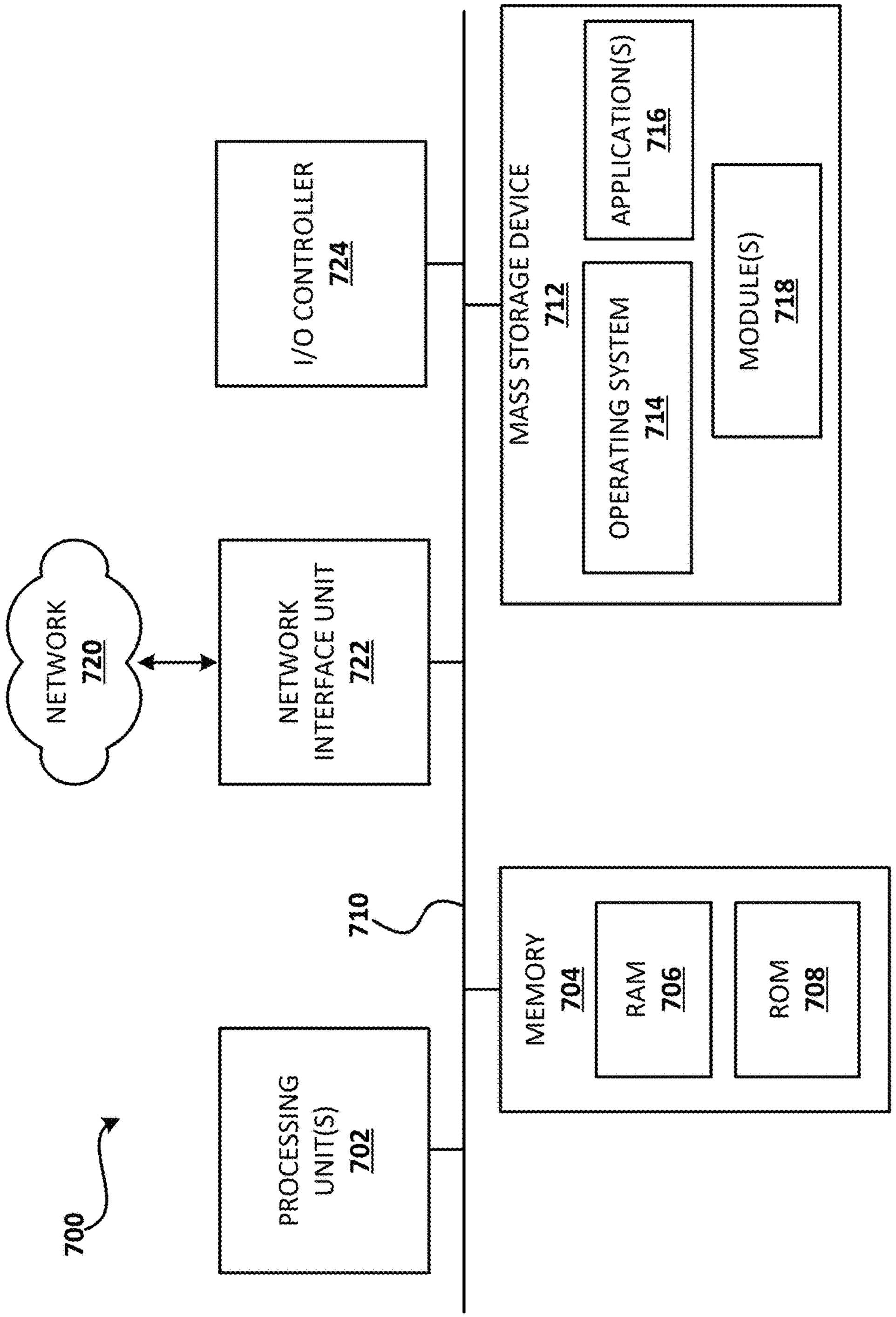
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the systems described herein, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural Processing Unites (NPUs) etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit (s) 702.

The present disclosure is supplemented by the following example clauses:

Example 1: A method comprising: identifying a plurality of correlations among a plurality of alerts; constructing an incident graph in which vertices represent the plurality of alerts and edges represent the plurality of correlations; pruning redundant edges from the incident graph; and performing a security operation based on the pruned incident graph.

Example 2: The method of Example 1, wherein identifying an individual correlation comprises identifying a pair of alerts that share an attribute.

Example 3: The method of Example 2, wherein the shared attribute of the pair of alerts comprises a shared IP address, a shared username, or a shared session identifier.

Example 4: The method of Example 2, wherein the attribute is associated with a time window, and wherein identifying the individual correlation comprises determining that the pair of alerts occurred within the time window.

Example 5: The method of Example 4, wherein the time window is increased based on a determination that the attribute indicates a heightened security risk.

Example 6: The method of Example 5, wherein the attribute comprises an IP address, and wherein the determination that the attribute indicates a heightened security risk comprises identifying the IP address in a list of malicious IP addresses.

Example 7: The method of Example 1, wherein performing the security operation comprises sending a report that includes the pruned incident graph as part of a description of an incident.

Example 8: A system comprising: a processing unit; and a computer-readable storage medium having computer-executable instructions stored thereupon, which, when executed by the processing unit, cause the processing unit to: receive a plurality of alerts; identify a plurality of pairwise correlations among the plurality of alerts, wherein an individual pair of alerts correlate by: having a shared attribute, and occurring within an attribute-specific time window; construct an incident graph in which vertices represent the plurality of alerts and edges represent the plurality of pairwise correlations; prune a redundant edge from the incident graph; and perform a security operation based on the pruned incident graph.

Example 9: The system of Example 8, wherein redundant edges are pruned using a minimum spanning tree algorithm.

Example 10: The system of Example 8, wherein the attribute-specific time window begins when an earlier of the individual pair of alerts occurred.

Example 11: The system of Example 8, wherein individual attribute-specific time windows are longer for higher-fidelity attributes.

Example 12: The system of Example 8, wherein the security operation automatically counters an incident described by the incident graph.

Example 13: The system of Example 8, wherein the plurality of pairwise correlations are filtered based on an indication from threat intelligence data about a shared attribute.

Example 14: The system of Example 13, wherein threat intelligence data indicates an IP address or a file are associated with malicious use.

Example 15: A computer-readable storage medium having encoded thereon computer-readable instructions that when executed by a processing unit causes a system to: receive a plurality of alerts; identify a plurality of pairwise correlations among the plurality of alerts, wherein an individual pair of alerts correlate by: having a shared attribute, and occurring within an attribute-specific time window; construct an incident graph in which vertices represent the plurality of alerts and edges represent the plurality of pairwise correlations; prune redundant edges from the incident graph; and perform a security operation based on the pruned incident graph.

Example 16: The computer-readable storage medium of Example 15, wherein the attribute-specific time window is adjusted based on the shared attribute being associated with malicious activity.

Example 17: The computer-readable storage medium of Example 16, wherein associations between attributes and malicious activity are refined with a human-in-the-loop feedback system.

Example 18: The computer-readable storage medium of Example 15, wherein the individual pair of alerts have a non-shared attribute, and wherein the instructions further cause the system to: omit the individual pair of alerts from the incident graph based on a determination that the individual pair of alerts have the non-shared attribute.

Example 19: The computer-readable storage medium of Example 15, wherein the incident graph comprises any alert that is connected to the individual pair of alerts by any number of edges.

Example 20: The computer-readable storage medium of Example 15, wherein the plurality of pairwise correlations are identified by incrementally performing a join operation on the plurality of alerts for a plurality of attributes.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

identifying a plurality of correlations among a plurality of alerts;

constructing an incident graph in which vertices represent the plurality of alerts and edges represent the plurality of correlations;

pruning redundant edges from the incident graph; by removing an existing edge between a first vertex and a second vertex in response to a determination that the first vertex and the second vertex remain connected through another path in the incident graph; and performing a security operation based on the pruned incident graph.

2. The method of claim 1, wherein identifying an individual correlation comprises identifying a pair of alerts that share an attribute.

3. The method of claim 2, wherein the shared attribute of the pair of alerts comprises a shared IP address, a shared username, or a shared session identifier.

4. The method of claim 2, wherein the attribute is associated with a time window, and wherein identifying the individual correlation comprises determining that the pair of alerts occurred within the time window.

5. The method of claim 4, wherein the time window is increased based on a determination that the attribute indicates a heightened security risk.

6. The method of claim 5, wherein the attribute comprises an IP address, and wherein the determination that the attribute indicates a heightened security risk comprises identifying the IP address in a list of malicious IP addresses.

7. The method of claim 1, wherein performing the security operation comprises sending a report that includes the pruned incident graph as part of a description of an incident.

8. The method of claim 1, wherein a correlation of the plurality of correlations is between a pair of alerts of the plurality of alerts, wherein the pair of alerts occurred within a defined time window, and wherein the defined time window is made longer or shorter based on a measure of suspicion of an attribute of at least one of the pair of alerts.

9. A system comprising:

a processing unit; and a computer-readable storage medium having computer-executable instructions stored thereupon, which, when executed by the processing unit, cause the processing unit to:

receive a plurality of alerts;

identify a plurality of pairwise correlations among the plurality of alerts, wherein an individual pair of alerts correlate by:

having a shared attribute, and occurring within an attribute-specific time window;

construct an incident graph in which vertices represent the plurality of alerts and edges represent the plurality of pairwise correlations;

prune a redundant edge from the incident graph; by removing an existing edge between a first vertex and a second vertex in response to a determination that the first vertex and the second vertex remain connected through another path in the incident graph; and perform a security operation based on the pruned incident graph.

10. The system of claim 9, wherein redundant edges are pruned using a minimum spanning tree algorithm.

11. The system of claim 9, wherein the attribute-specific time window begins when an earlier of the individual pair of alerts occurred.

12. The system of claim 9, wherein individual attribute-specific time windows are longer for higher-fidelity attributes.

13. The system of claim 9, wherein the security operation automatically counters an incident described by the incident graph.

14. The system of claim 9, wherein the plurality of pairwise correlations are filtered based on an indication from threat intelligence data about a shared attribute.

15. The system of claim 14, wherein threat intelligence data indicates an IP address or a file are associated with malicious use.

16. A non-transitory computer-readable storage medium having encoded thereon computer-readable instructions that when executed by a processing unit cause a system to:

receive a plurality of alerts;

identify a plurality of pairwise correlations among the plurality of alerts, wherein an individual pair of alerts correlate by:

having a shared attribute, and occurring within an attribute-specific time window;

construct an incident graph in which vertices represent the plurality of alerts and edges represent the plurality of pairwise correlations;

prune redundant edges from the incident graph; by removing an existing edge between a first vertex and a second vertex in response to a determination that the first vertex and the second vertex remain connected through another path in the incident graph; and perform a security operation based on the pruned incident graph.

17. The computer-readable storage medium of claim 16, wherein the attribute-specific time window is adjusted based on the shared attribute being associated with malicious activity.

18. The computer-readable storage medium of claim 16, wherein the individual pair of alerts have a non-shared attribute, and wherein the instructions further cause the system to:

omit the individual pair of alerts from the incident graph based on a determination that the individual pair of alerts have the non-shared attribute.

19. The computer-readable storage medium of claim 16, wherein the incident graph comprises any alert that is connected to the individual pair of alerts by any number of edges.

20. The computer-readable storage medium of claim 16, wherein the plurality of pairwise correlations are identified by incrementally performing a join operation on the plurality of alerts for a plurality of attributes.

* * * * *